(12) United States Patent
Heinitz

(10) Patent No.: US 12,043,214 B1
(45) Date of Patent: Jul. 23, 2024

(54) TELESCOPING CARGO BOX

(71) Applicant: Kep Heinitz, Buena Vista, CO (US)

(72) Inventor: Kep Heinitz, Buena Vista, CO (US)

( * ) Notice: Subject to any disclaimer, the term of this patent is extended or adjusted under 35 U.S.C. 154(b) by 172 days.

(21) Appl. No.: 17/875,652

(22) Filed: Jul. 28, 2022

(51) Int. Cl.
*B60R 5/04* (2006.01)
*B62D 33/10* (2006.01)

(52) U.S. Cl.
CPC .............. *B60R 5/041* (2013.01); *B62D 33/10* (2013.01)

(58) Field of Classification Search
CPC  B60R 5/041; B60R 11/06; B60R 9/06; B62D 33/10
USPC .......................................................... 224/404
See application file for complete search history.

(56) References Cited

U.S. PATENT DOCUMENTS

| | | | |
|---|---|---|---|
| 7,182,177 B1* | 2/2007 | Simnacher | B66F 3/12 224/404 |
| 9,481,403 B1* | 11/2016 | Johnson | B62D 33/023 |
| 10,328,863 B2* | 6/2019 | Spahn | B60R 9/06 |
| 11,059,423 B1* | 7/2021 | Weaver | B62D 33/027 |
| 11,440,481 B1* | 9/2022 | Cooper | B62D 33/0276 |

* cited by examiner

*Primary Examiner* — Adam J Waggenspack
(74) *Attorney, Agent, or Firm* — Edwin H. Crabtree; Ramon L. Pizarro

(57) ABSTRACT

A cargo box adapted for receipt inside a side panel of a pickup truck and the cargo box adapted for receipt inside a cargo box container received over a wheel well in a back of the pickup truck. The subject cargo box includes a horizontal tool shelf attached to a vertical back plate. A pair of spaced apart vertical slides are attached to the back plate and are received through slide openings in a slide frame. The slide frame is mounted on a pair of slide frame legs. The slide frame legs rest on top of a pickup bed floor. A Fob operated telescoping actuator is attached to a side of the back plate for raising the cargo box above the top of the side panel and lowering the cargo box inside the side panel.

12 Claims, 4 Drawing Sheets

TELESCOPING CARGO BOX

BACKGROUND OF THE INVENTION

(a) Field of the Invention

This invention relates to a telescoping cargo box for holding various tools and the like and more particularly, but not by way of limitation, to a cargo box for receipt inside a hollow side panel on a pickup truck or a free standing cargo box mounted in the back of the pickup truck. The cargo box adapted for being raised above the side panel and lowered inside the side panel, prior to travel.

(b) Discussion of Prior Art

Heretofore, certain modern pickup trucks have a side panel with a top lid that can be raised for storing various work tools and other items inside the panel. Only the top of the tools or a top of a tool box is exposed prior to removing the items from the side panel. The subject invention allows for a complete view of the tools by raising the tools above the top of the side panel and at eye level for ease in removing a correct tool and ease in storage.

SUMMARY OF THE INVENTION

In view of the foregoing, it is a primary objective of the subject invention to provide a telescoping cargo box adapted for ease in viewing and holding various types and sizes of work tools and other objects.

Another object of the invention is the cargo box is adapted for receipt inside a hollow side panel on a pickup truck. The cargo box can be raised above the side panel and lowered inside the side panel prior to travel. Also, the cargo box inside a cargo box container, which can be free standing and placed over a wheel well in the back of the truck.

Still another object of the invention is cargo box can be used for holding a rifle and other fire arms safely inside the side panel. In some states, it's against the law to display fire arms openly inside the cab of a pickup truck.

The subject cargo box includes a horizontal tool shelf attached to a vertical back plate. A pair of spaced apart vertical slides are attached to the back plate and are received through slide openings in a slide frame. The slide frame is mounted on a pair of slide frame legs. The slide frame legs rest on top of a pickup bed floor. A telescoping actuator is attached to a side of the back plate for raising the cargo box above the top of the side panel and lowering the cargo box inside the side panel.

These and other objects of the present invention will become apparent to those familiar with pickup trucks and tool storage side panels when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject cargo box, and in which.

DETAILED DESCRIPTION OF THE PREFERRED EMBODIMENTS

Figure 1:
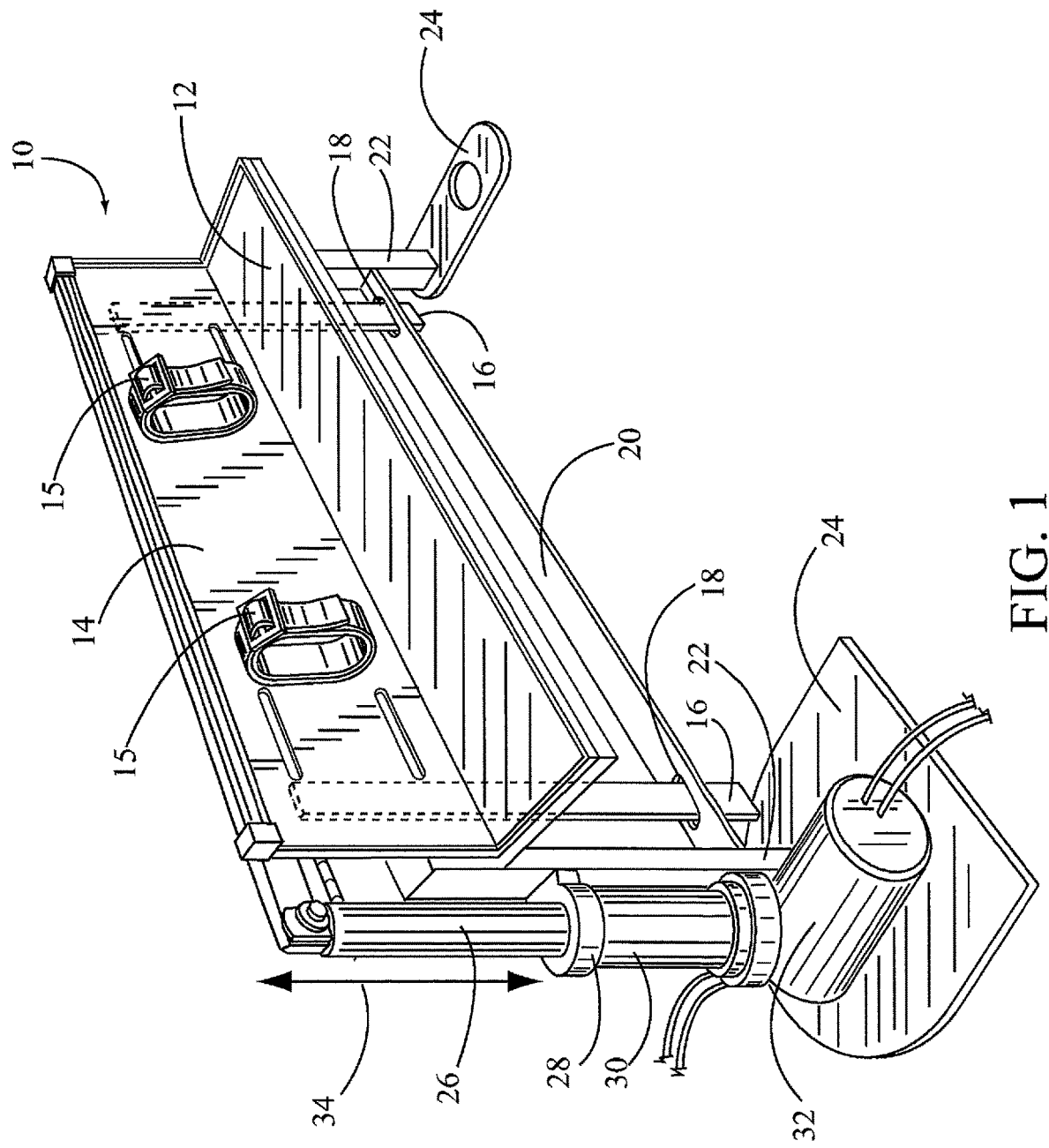
FIG. 1 is a perspective view of the telescoping cargo box with a motor driven actuator for raising and lower the cargo box. The cargo box can be received inside a side panel on a pickup truck or inside a cargo box container received in the back of the truck.

In FIG. 1, a perspective view of the subject telescoping cargo box is shown having a general reference numeral 10. The box 10 includes a horizontal tool shelf 12 and an attached vertical back plate 14. The back panel can include a pair of straps 15 for holding a rifle. An upper portion of a pair of spaced apart vertical slides 16 are attached to the back of the back plate 14. A lower portion of the slides are received through slide openings 18 in a horizontal slide frame 20. The slide frame is mounted on a pair of slide frame legs 22. A bottom of the legs 22 are mounted on top of leg stands 24.

An upper portion 26 of an actuator 28 is attached to a side of the back plate 14. A lower portion 30 of the actuator 28 is attached to a battery operated motor 32. When the motor 32 is turned "on", the upper portion 26 extends upwardly raising the back plate 14 and shelf 14 for ease in viewing the tools and access to the tools shored on the cargo box 10. Arrow 34 illustrates the up and down telescoping movement of the actuator 28. L As mentioned above, the cargo box 10 can also be free standing and received over a wheel well in the back of a pickup truck.

Figure 2:
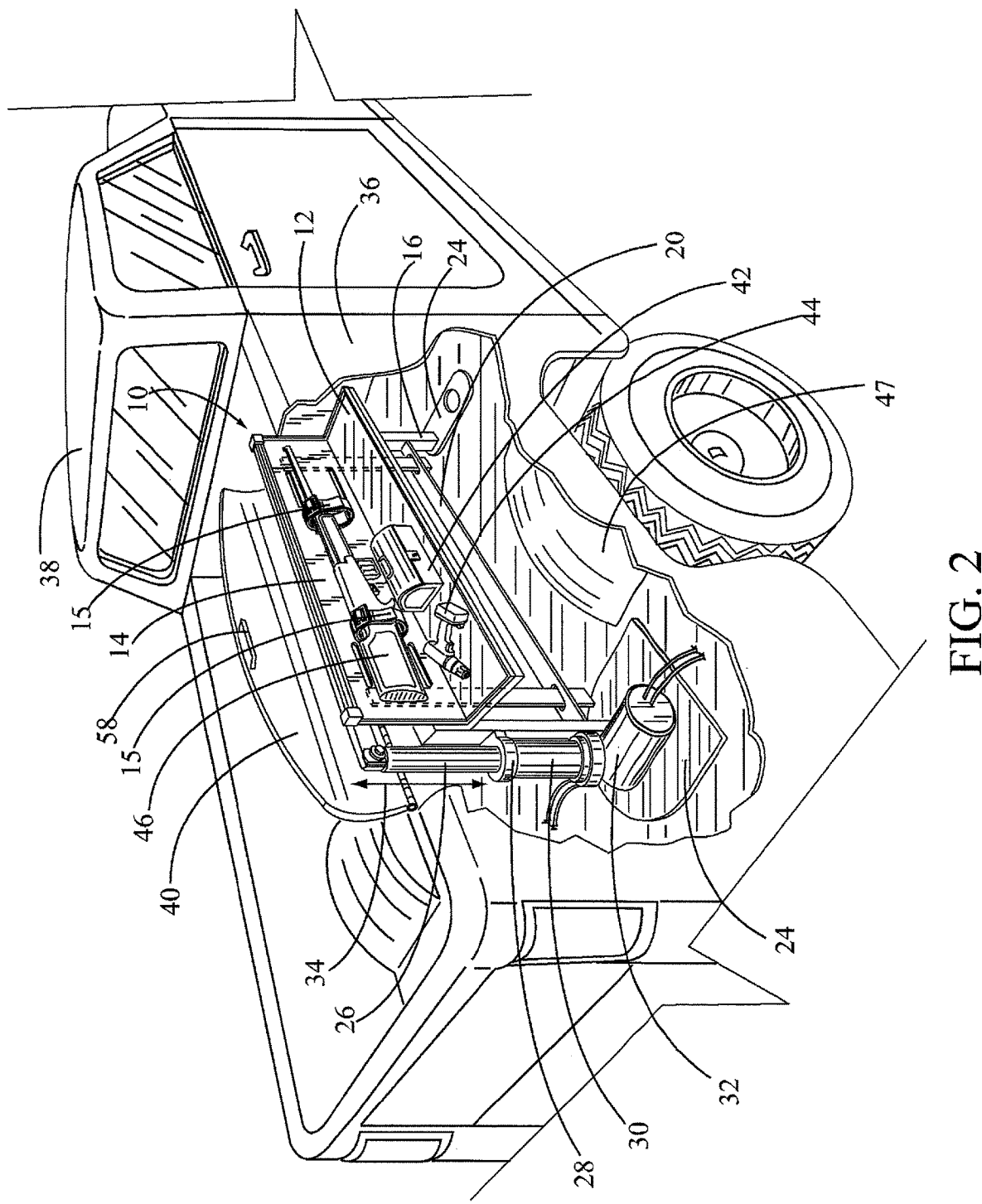
FIG. 2 is another perspective view of the cargo box installed inside the side panel of a pickup truck.

In FIG. 2, another perspective view of the cargo box 10 is shown and installed inside a side panel 36 of a pickup truck 38. In this drawing, the side panel 36 includes a lid 40, which is raised prior to the operation of the cargo box 10. The tool shelf 12 is shown having a tool box 42 and electric drill 44 stored thereon and a rifle 46 attached to the straps 15 on the back plate 14. The cargo box 10, in this drawing, has been raised partially by the actuator 28. In operation, the cargo box 10 will be raised above the top of the side panel 36 for ease in access to the tools on the tool shelf and back plate.

Figure 3:
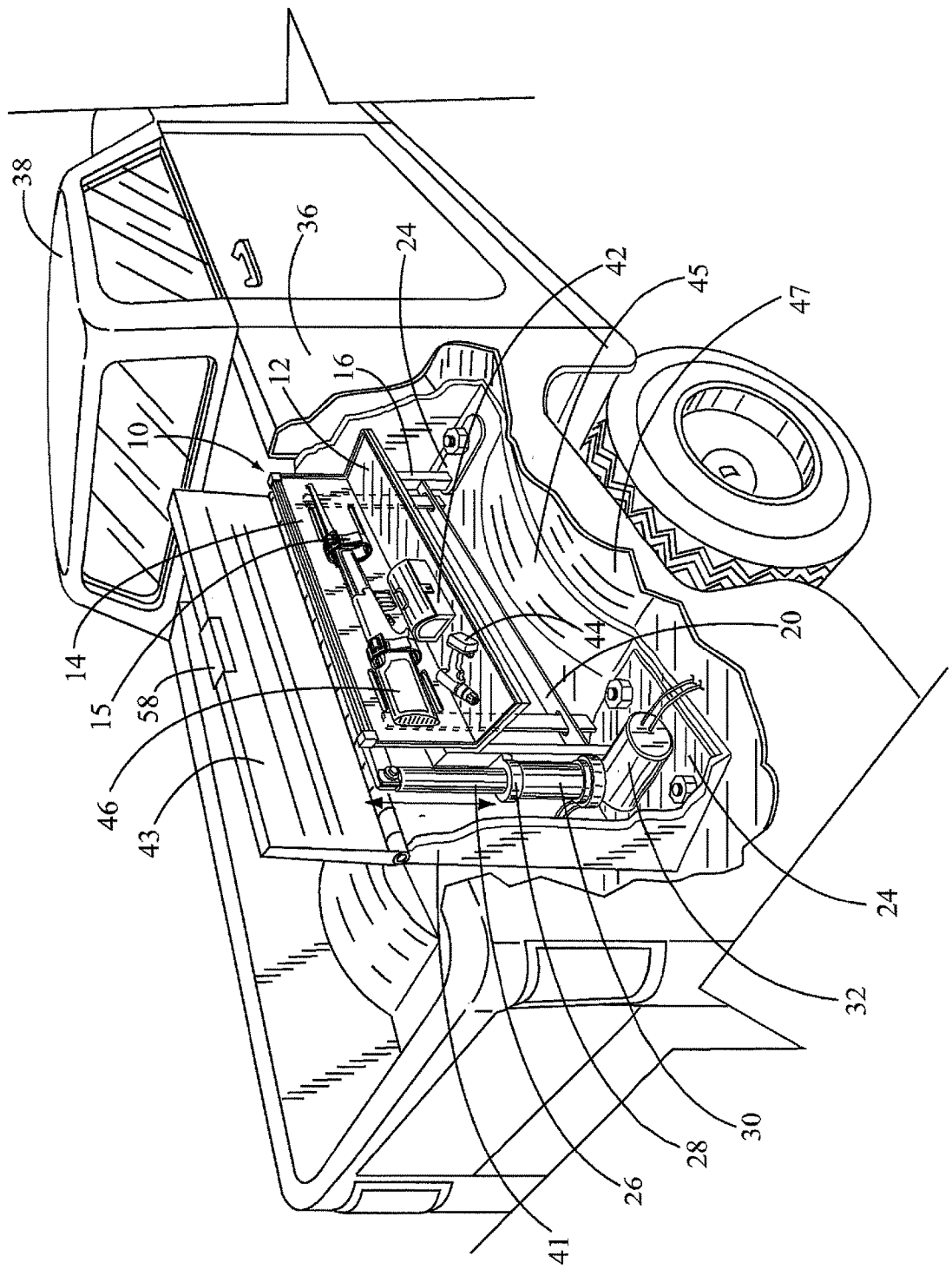
FIG. 3 is a perspective view of the cargo box installed inside a cargo box container and mounted over a wheel well in the back of the truck.

In FIG. 3 a perspective view of the cargo box 10 is shown installed in a free standing cargo box container 41, with a lid 43. The cargo box container 41 is shown cutaway to illustrate the cargo box 10, as illustrated in FIG. 2. A bottom portion of the container 41 includes a concave container wheel well 45, adapted for receipt over a truck wheel well 47 in the bed of the pickup truck 38.

Figure 4:
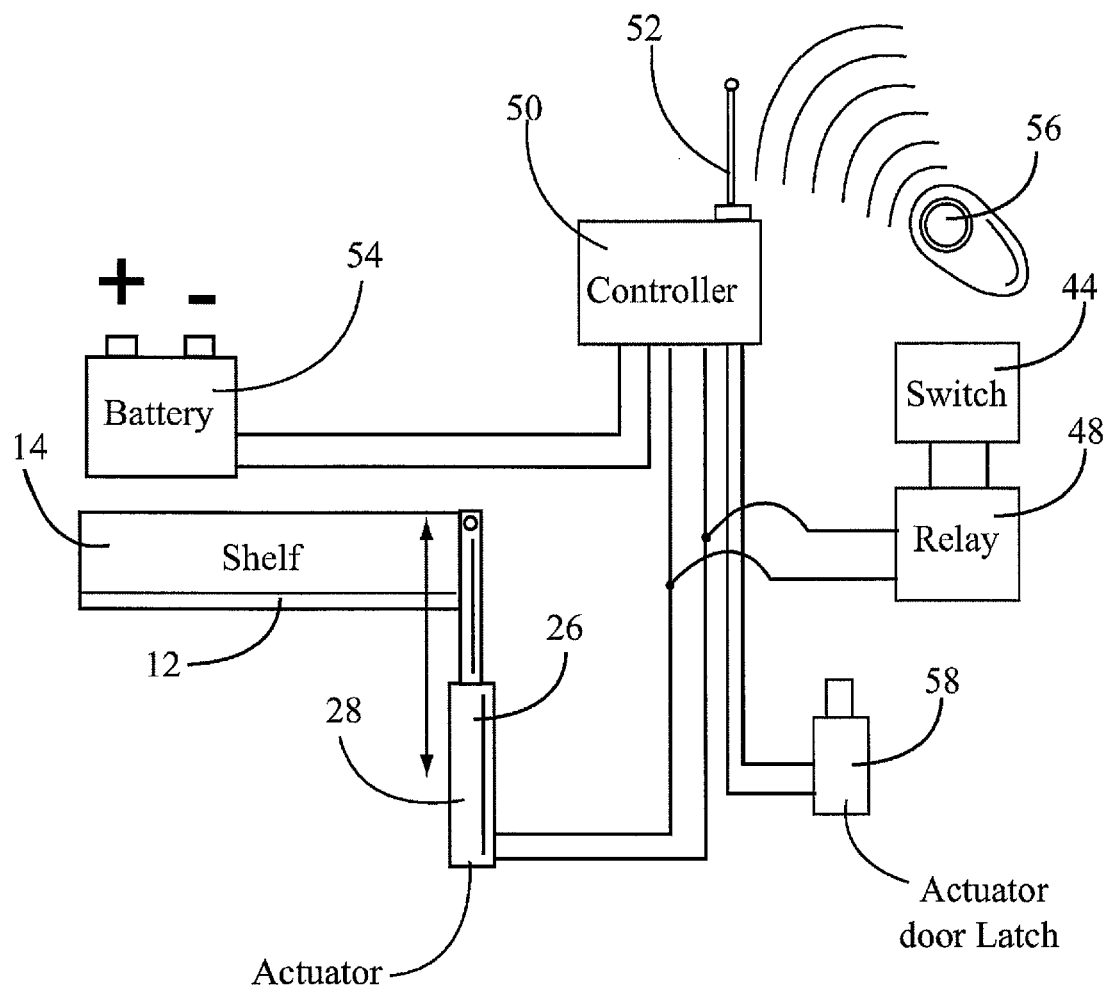
FIG. 4 is an electrical diagram for operating the cargo box and the motor driver actuator.

In FIG. 4, an electrical diagram for operating the cargo box 10 is shown. In this drawing, the actuator 30 is shown connected to a relay 48 and controller 50, with an antenna 52. A plunger switch 49 is used to activate the actuator 28. The controller is connected to a battery 54. To start the operation of the cargo box 10, a Fob 56 is pressed, sending a signal to the controller 50 and the switch 49 connected to the relay 48. At this time, an actuator door latch 58 on the lid 40 is opened, as shown in FIG. 2. When the Fob 56 is pressed again, the actuator 28 is activated and the cargo box 10 is raised above the side panel 36, as shown in FIG. 2 or above the cargo box container 41 as shown in FIG. 3, thus providing easy access to the tool shelf 12 and the back plate 14.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A cargo box adapted for receipt inside a side panel of a pickup truck, the cargo box comprising:
    a horizontal tool shelf adapted for receiving tools thereon:
    a vertical back plate attached to the horizontal tool shelf;
    a pair of spaced apart vertical slides are attached to the back plate;
    a slide frame disposed under the tool shelf, the slide frame having slide openings for receiving the vertical slides;
    a pair of slide frame legs attached to the slide frame, the slide frame legs adapted for receipt on top of a pickup bed floor; and
    a telescoping actuator attached to a side of the back plate for raising and lower the cargo box inside the side panel.

2. The cargo box as described in claim 1 wherein the actuator is battery operated.

3. The cargo box as described in claim 1 wherein the actuator is driven by a motor.

4. The cargo box as described in claim 3 wherein the actuator is operated using a remote fob.

5. A cargo box adapted for receipt over a wheel well in a back of a pickup truck, the cargo box comprising:
    a horizontal tool shelf adapted for receiving tools thereon:
    a vertical back plate attached to the horizontal tool shelf;
    a pair of spaced apart vertical slides are attached to the back plate;
    a slide frame disposed under the tool shelf, the slide frame having slide openings for receiving the vertical slides;
    a pair of slide frame legs attached to the slide frame; and
    a telescoping actuator attached to a side of the back plate for raising and lowering the cargo box inside a cargo box container, the cargo box container having a concave container wheel well adapted for receipt over the wheel well in the back of the pickup truck.

6. The cargo box as described in claim 5 wherein the actuator is battery operated.

7. The cargo box as described in claim 5 wherein the actuator is driven by a motor.

8. The cargo box as described in claim 5 wherein the actuator is operated using a remote fob.

9. A cargo box adapted for receipt inside a side panel of a pickup truck or inside a cargo box container adapted for receipt over a wheel well in a back of the pickup truck, the cargo box comprising:
    a horizontal tool shelf adapted for receiving tools thereon:
    a vertical back plate attached to the horizontal tool shelf;
    a pair of spaced apart vertical slides attached to the back plate;
    a slide frame disposed under the tool shelf, the slide frame having slide openings for receiving the vertical slides;
    a pair of slide frame legs attached to the slide frame, and
    a telescoping actuator attached to a side of the back plate for raising and lower the cargo box.

10. The cargo box as described in claim 9 wherein the actuator is battery operated.

11. The cargo box as described in claim 9 wherein the actuator is driven by a motor.

12. The cargo box as described in claim 11 wherein the actuator is operated using a remote fob.

* * * * *